United States Patent
Muraki (10) Patent No.: US 9,720,877 B2
(45) Date of Patent: Aug. 1, 2017

(54) ELECTRONIC DEVICE, METHOD FOR CONTROLLING DISPLAY OF VARIABLE, AND RECORDING MEDIUM RECORDING VARIABLE DISPLAY CONTROLLING PROGRAM

(71) Applicant: CASIO COMPUTER CO., LTD., Shibuya-ku (JP)

(72) Inventor: Akiko Muraki, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 265 days.

(21) Appl. No.: 14/659,733

(22) Filed: Mar. 17, 2015

(65) Prior Publication Data

US 2015/0269114 A1    Sep. 24, 2015

(30) Foreign Application Priority Data

Mar. 19, 2014  (JP) .................................. 2014-056121

(51) Int. Cl.
G06F 15/02  (2006.01)

(52) U.S. Cl.
CPC ................................ G06F 15/0225 (2013.01)

(58) Field of Classification Search
CPC .................................................. G06F 15/0225
USPC .................................. 708/130–146, 160–162
See application file for complete search history.

(56) References Cited

U.S. PATENT DOCUMENTS

| | | | | |
|---|---|---|---|---|
| 4,845,652 A * | 7/1989 | Bunsen | .................... | G06F 17/11 708/144 |
| 5,067,102 A * | 11/1991 | Eisenstein | ............. | G06F 17/215 708/136 |
| 5,532,946 A * | 7/1996 | Phipps | ................ | G06F 15/0225 345/440.1 |
| 6,142,367 A * | 11/2000 | Satoh | ...................... | G06F 15/02 235/145 R |
| 2006/0235912 A1 * | 10/2006 | Yu | ........................... | G06F 17/10 708/200 |

FOREIGN PATENT DOCUMENTS

| JP | 09-185585 | 7/1997 |
|---|---|---|
| JP | 2000-331036 | 11/2000 |
| JP | 2009-059256 | 3/2009 |
| JP | 2012-068745 | 4/2012 |

* cited by examiner

*Primary Examiner* — Tan V. Mai
(74) *Attorney, Agent, or Firm* — Cozen O'Connor (57) ABSTRACT

An electronic device includes: a memory; and a processor. The processor causes a display section to display variables and variable values stored in the memory in a list form, causes the display section to display a first variable specified by a user operation as a first part of an expression, causes the display section to display the variables and the variable values after the first variable is displayed, causes the display section to display a second variable specified by a user operation as a second part of the expression, together with the first part, and calculates the expression based on the first part and the second part by referring to a variable value of the first variable and a variable value of the second variable to obtain a calculation result.

8 Claims, 6 Drawing Sheets

| | TYPE | TYPE | DECIMAL PART | DISPLAY |
|---|---|---|---|---|
| a | Comma | Comma | WITHOUT SEPARATOR | $-123{,}456.7891 \times 10^{45}$ |
| b | Dot | Dot | WITHOUT SEPARATOR | $-123.456{,}7891 \times 10^{45}$ |
| c | Space(DN) | Space | WITH SEPARATOR | $-123\ 456.789\ 1 \times 10^{45}$ |
| d | Space | Space | WITHOUT SEPARATOR | $-123\ 456.7891 \times 10^{45}$ |
| e | India | India | WITHOUT SEPARATOR | $-1{,}23{,}456.7891 \times 10^{45}$ |
| f | NO SEPARATOR | Off | WITHOUT SEPARATOR | $-123456.7891 \times 10^{45}$ |

FIG.5B

| COUNTRY | SETTING 1: ON | | SETTING 1: OFF | |
|---|---|---|---|---|
| China | d | Space | f | NO SEPARATOR |
| India | e | India | f | NO SEPARATOR |
| Japan | a | Comma | f | NO SEPARATOR |
| ... | ... | | f | NO SEPARATOR |

`⌈25000000⌋` [A] STO (−)

SHIFT (MODE SETUP)

1: Recur Decimal
2: Decimal Point
3: Separator
4: Simplify

Separator
1: On
2: Off

`⌈12340000000⌋` [C] hyp STO

SHIFT [RCL] STO

ALPHA (−) [A]   or   ALPHA (−) [A]

SHIFT [RCL] ▼

ALPHA S⇔D [Y]   or   ALPHA S⇔D [Y] ,,, [B]

ALPHA hyp [C] ALPHA S⇔D [Y] sin [D] STO

SHIFT (MODE SETUP) 3 2

SHIFT [RCL] STO

ELECTRONIC DEVICE, METHOD FOR CONTROLLING DISPLAY OF VARIABLE, AND RECORDING MEDIUM RECORDING VARIABLE DISPLAY CONTROLLING PROGRAM

CROSS-REFERENCE TO RELATED APPLICATIONS

This application is based upon and claims the benefit of priority from the prior Japanese Patent Application No. 2014-056121 filed on Mar. 19, 2014, the entire contents of which are incorporated herein by reference.

BACKGROUND OF THE INVENTION

Field of the Invention

The present invention relates to an electronic device, a method for controlling displays of variables, and a recording medium recording a variable display controlling program, which are capable of displaying at least a numerical value of a variable.

Description of the Related Art

Heretofore, as a mathematical expression input device such as a scientific calculator which can receive inputs of mathematical expressions to execute calculations, for example, there has been known a mathematical expression input device configured to display a list of meanings of variables so that a user can confirm the meanings of the variables when he/she inputs a relational expression of the variables as a mathematical model (see Japanese Patent Application Laid-Open Publication No. 2000-331036).

Such mathematical expression input device displays a list of words/phrases, as the meanings of the variables, such as a driving force, mass, elastic modulus, rupee rate (i.e. a rate of Indian rupee), and yuan rate (i.e. a rate of Chinese yuan), on a screen.

The above mathematical expression input device allows a user to see the displayed list to confirm the meanings of the variables. However, a user can know only the meanings of the variables, and cannot confirm the specific numerical values of the variables, from the displayed list. To confirm the numerical values set to the respective variables, a user needs to repeatedly perform a process to select each of the variables and to retrieve a numerical value corresponding thereto. Thus, the mathematical expression input device is not always convenient for a user.

The present invention is made in view of the above problems, and an object of the present invention is to provide an electronic device, a method for controlling displays of variables, and a recording medium recording a variable display controlling program, which enable a user to collectively confirm variable values set to all variables, respectively.

SUMMARY OF THE INVENTION

According to the first aspect of the present invention, there is provided an electronic device including: a memory; and a processor, wherein the processor causes a display section to display a plurality of variables and variable values of the variables stored in the memory in a list form, causes the display section to display a first variable specified by a user operation, among the variables displayed in the list form, as a first part of an expression, causes the display section to display the plurality of variables and the variable values of the variables after the display section displays the first variable as the first part of the expression, causes the display section to display a second variable specified by a user operation, among the variables displayed in the list form, as a second part of the expression, together with the first part, and calculates the expression based on the first part and the second part by referring to a variable value of the first variable and a variable value of the second variable among the variable values to obtain a calculation result.

BRIEF DESCRIPTION OF THE SEVERAL VIEWS OF THE DRAWINGS

The above and further objects, features and advantages of the present invention will be made clearer by the following detailed description and the attached drawings, in which:

FIGS. 6A to 6L are diagrams illustrating operations and displayed contents on the display.

DETAILED DESCRIPTION OF THE PREFERRED EMBODIMENTS

Hereinafter embodiments where a mathematical expression input device of the present invention is applied to a scientific calculator will be described in detail with reference to the drawings. In this regard, however, the scope of the present invention is not limited to the illustrated examples.

[External Appearance]

Figure 1:
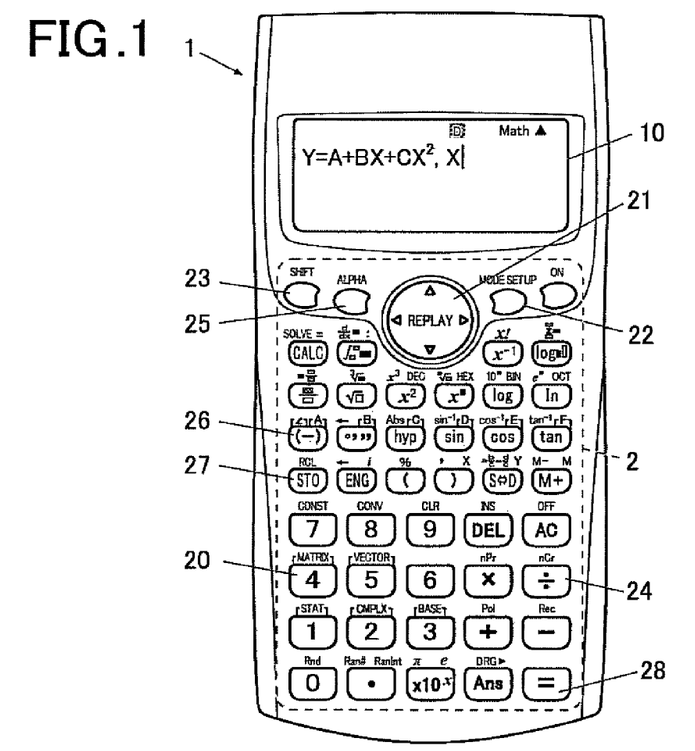
FIG. 1 is a plan view illustrating an external appearance of a scientific calculator as an example of a mathematical expression input device.

FIG. 1 is a plan view of a scientific calculator 1 as a mathematical expression input device of the present invention. As illustrated in FIG. 1, the scientific calculator 1 is equipped with an input key group 2 including various kinds of keys, and a display 10.

The input key group 2 is composed of plural keys for receiving operations to input mathematical expression components such as numerical values and signs indicating calculations and/or operations to instruct to perform various processes, from a user. To each of the plural keys, a unique function is allocated. In this embodiment, the input key group 2 includes a numeric keypad 20, cursor key 21, MODE SETUP key 22, SHIFT key 23, sign input keys 24, ALPHA key 25, VARIABLE keys 26, STO key 27, etc.

The numeric keypad 20 is composed of keys each of which receives an operation to input a numerical value. The cursor key 21 is pressed when a user moves a cursor indicating an edit target position and/or selection target position in a predetermined direction within the display 10. The cursor key 21 of this embodiment is configured to be capable of receiving inputs for moving the cursor in four directions of up and down, left and right.

The MODE SETUP key 22 is pressed when a user sets/changes a mode among various kinds of modes, which is described later. The SHIFT key 23 is pressed when a user changes a function of a certain key from a function described on the surface of the key to a function described above the same key, and vice versa. The sign input keys 24 receive inputs of signs such as of addition, subtraction, multiplication and division, and inputs of signs/functions such as of logarithm (log) and square root, necessary for inputting mathematical expressions.

The ALPHA key 25 is pressed when a user inputs each of variables designated by alphabet letters, A to F, M, X and Y, respectively. In this embodiment, a certain alphabet letter as a variable is input, in the mathematical expression which is being currently input, by pressing the ALPHA key 25 and then pressing a key corresponding to the certain alphabet letter among the VARIABLE keys 26. Alternatively, in the case that an "RCL" (Recall) function is being executed and a list of stored variable values of respective variables is being displayed, each variable can be input, without pressing the ALPHA key 25, by pressing a key corresponding to a certain alphabet letter among the VARIABLE keys 26. Also in this case, each variable can be input by pressing the ALPHA key 25 and then pressing a key corresponding to a certain alphabet letter among the VARIABLE keys 26.

In this embodiment, when the MODE SETUP key 22 is pressed and then a predetermined key of the numeric keypad 20 is pressed, a calculation mode can be changed to a matrix mode (see a key of "MATRIX" in FIG. 1), vector mode (see a key of "VECTOR" in FIG. 1), complex number mode (see a key of "CMPLX" in FIG. 1), etc.

The SHIFT key 23 is configured so that when the SHIFT key 23 is pressed and then a certain key of the input key group 2 is pressed, the content described above the certain key is input. For example, when the SHIFT key 23 is pressed and then a "sin" key is pressed, "sin$^{-1}$" described above the "sin" key is input.

The STO key 27 is pressed when a user sets a variable value with respect to a certain variable. For example, when a user presses respective keys of "1", "0", "STO" and "A" in this order, the display 10 displays "10→A", and "10" is set to variable "A". In this embodiment, when the STO key 27 is pressed and then a "(−)" key is pressed, the "(−)" key being one of the VARIABLE keys 26, variable "A" is automatically input. Alternatively, the scientific calculator 2 can be configured, so that variable "A" is input, when the ALPHA key 25 is pressed after the STO key 27 is pressed, and then the "(−)" key is pressed.

The "RCL" (Recall) function, the characters of "RCL" being written above the STO key 27, is executed when the SHIFT key 23 is pressed and then the STO key 27 is pressed, to retrieve the stored variable values of the respective variables (Recall function: see FIG. 1). When the Recall function is performed, the variable values of the respective variables (A to F, M, X and Y) stored in a later-described storage section 16 are displayed in a list form on the display 10. This point will be described later.

A "=" key as an execution key 28 is pressed when a user instructs to perform calculation processing after inputting the mathematical expression.

The display 10 is composed of a Liquid Crystal Display (LCD), Electronic Luminescent Display (ELD) or the like, and displays various data such as characters, symbols, signs, functions and calculation results, with a plurality of dots, depending on operations in the input key group 2, etc. Alternatively, for example, a touch panel may be provided integrally with the display 10 so as to be disposed over the entire screen surface of the display 10.

[Internal Configuration]

Figure 2:
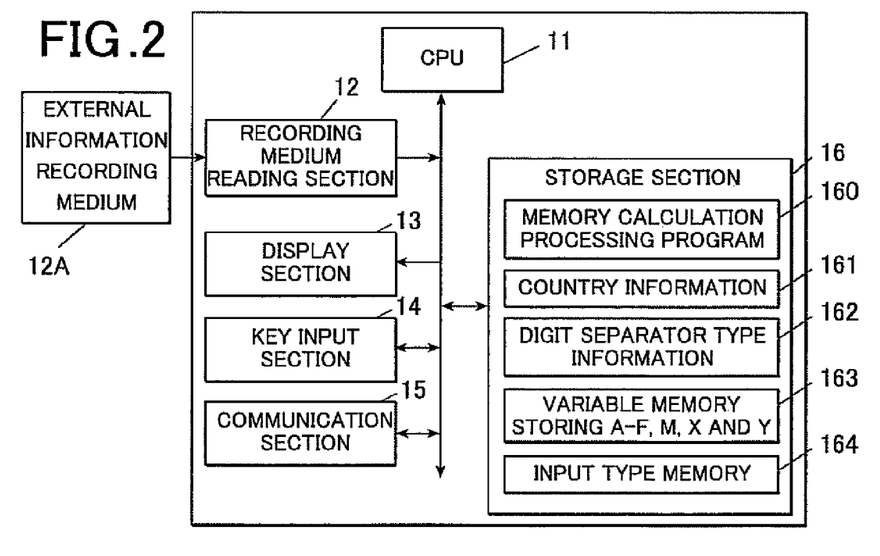
FIG. 2 is a block diagram illustrating an inner configuration of the scientific calculator.

Next, the internal configuration of the scientific calculator 1 will be described. FIG. 2 is a block diagram illustrating the internal configuration of the scientific calculator 1. As illustrated in FIG. 2, the scientific calculator 1 includes a recording medium reading section 12, a display section 13, a key input section 14, a communication section 15, the storage section 16, and a Central Processing Unit (CPU) 11.

The recording medium reading section 12 reads information from an external information recording medium 12A such as a USB memory, which is detachably attached to the scientific calculator 1.

The display section 13 is equipped with the above-mentioned display 10, and causes the display 10 to display various pieces of information according to display signals sent from the CPU 11.

The key input section 14 is equipped with the above-mentioned input key group 2 (the input key group 2 and the touch panel in the case of providing the touch panel as described above), and outputs key input signals corresponding to the respective keys pressed by a user to the CPU 11. The CPU 11 receives the key input signals corresponding to the respective keys pressed by a user, causes the display section 13 to display the mathematical expressions corresponding to the key input signals, and performs calculations.

The communication section 15 is capable of being connected to a not-illustrated network so as to be able to communicate with external devices (e.g. a server, computer, etc.) connected to the network.

The storage section 16 is a memory which stores programs and data for executing various functions of the scientific calculator 1, and functions as a work area for the CPU 11. In this embodiment, the storage section 16 has a storage area for a memory calculation processing program 160 as the program of the present invention. The memory calculation processing program 160 causes the CPU 11 to execute a later-described memory calculation processing (see FIG. 3).

The storage section 16 also includes a storage area for country information 161, a storage area for digit separator type information 162, etc. These areas will be described later. Furthermore, the storage section 16 includes a storage area (i.e. a variable memory 163) for storing the variables of A to F, M, X and Y, and a storage area (i.e. an input type memory 164) for storing input mathematical expressions. Thus, the storage section 16 of this embodiment functions as a variable value storing member which stores the variable values of the plural variables.

The CPU 11 centrally controls the respective sections/members of the scientific calculator 1. Specifically, the CPU 11 reads out the program specified among system programs and/or various application programs stored in the respective storage areas of the storage section 16, expands the read programs in the work area of the storage section 16, and performs various processes in cooperation with the program expanded in the storage section 16. The CPU 11 also controls the display section 13 to perform necessary displays on the display 10.

[Operations]

Next, the operations of the scientific calculator 1 as the mathematical expression input device of this embodiment will be described based on the flowchart of FIG. 3, while referring to other drawings. Also the functions of the scientific calculator 1 as the mathematical expression input device of this embodiment will be described.

Because the operations of the mathematical expression input device (the scientific calculator 1) described below are performed according to the memory calculation processing program 160 illustrated in FIG. 2, also the memory calculation processing program 160 as the program of the present invention will be described below.

Figure 3:
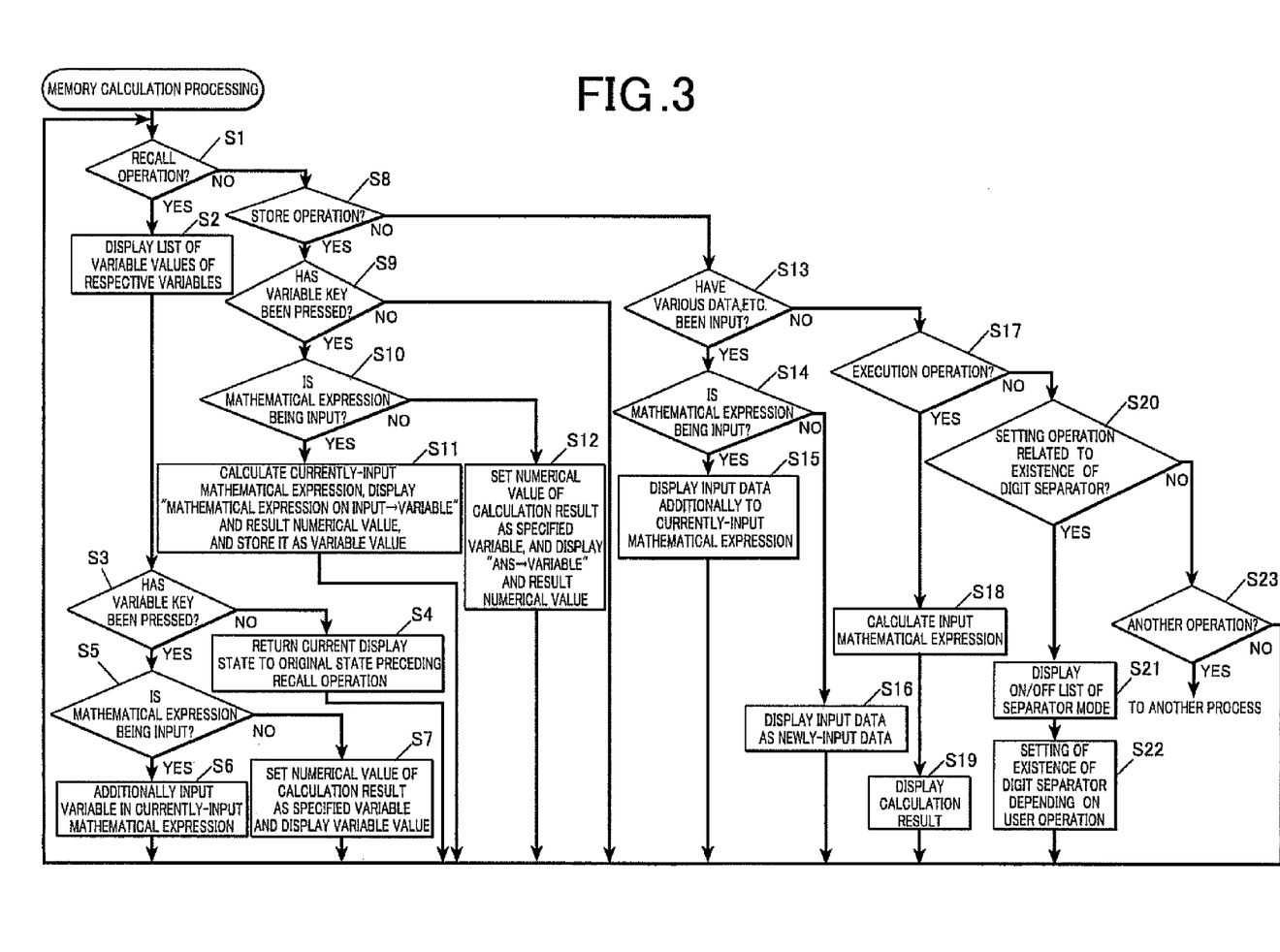
FIG. 3 is a flowchart illustrating a flow of processing in the scientific calculator.

Moreover, though the explanation is omitted in the flowchart of FIG. 3, a user can arbitrarily move the position of the cursor on the display 10 by operating the above-described cursor key 21 (for example, see FIG. 4G described later), also in this embodiment, similarly to the conventional scientific calculator. The mathematical expressions input by user operations are stored in the storage area (i.e. the input type memory 164; see FIG. 2) of the storage section 16 storing the input mathematical expressions, as the occasion demands.

First, general operations/processes executed also in the conventional scientific calculator will be described here, while the variable Recall batch display processing characteristic of the present invention, namely, the processes (Steps S1 to S7) following the Recall operation, will be described later. Incidentally, when a user executes another operation except the operations described later (Step S23: YES), the CPU 11 of the scientific calculator 1 shifts to another process corresponding to the executed operation, and terminates the routine illustrated in FIG. 3.

Hereinafter, the operations will be described along the specific examples in the complex number mode, illustrated in FIGS. 4A to 4J. In this case, as described above, a user changes the mathematical expression input mode to the complex number input mode by pressing the MODE SETUP key 22 (see FIG. 1) and then pressing the "2" key (the key of "CMPLX" in FIG. 1) of the numeric keypad 20, in this embodiment.

[Data Input Processing]

The CPU 11 of the scientific calculator 1 judges whether or not the mathematical expression is currently being input (Step S14), when various data such as characters (variables), signs, symbols, functions, etc. are input (Step S13: YES) by pressing any key of the numeric keypad 20 or the sign input keys 24, or by pressing the sign input keys 24 while the SHIFT key 23 is pressed, or by pressing the ALPHA key 25 and then pressing any one of VARIABLE keys 26 (i.e. inputting any one of variables A to F, M, X and Y).

When the mathematical expression is currently being input (Step S14: YES), the process is performed to display the input data (characters, signs, symbols, functions, etc.) additionally to the currently-input mathematical expression (Step S15). When the mathematical expression is not currently being input (Step S14: NO), the process is performed to display the input data as new input data on the display 10 (Step S16).

Figure 4A:
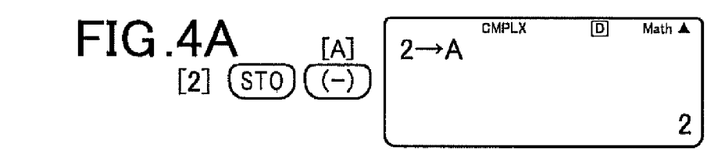
FIGS. 4A to 4J are diagrams illustrating operations and displayed contents on a display.
Figure 4B:
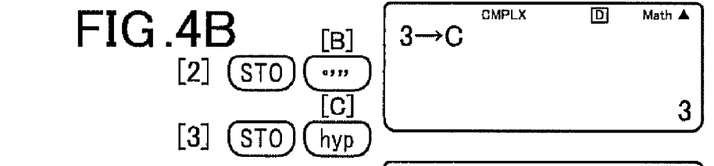
Figure 4C:
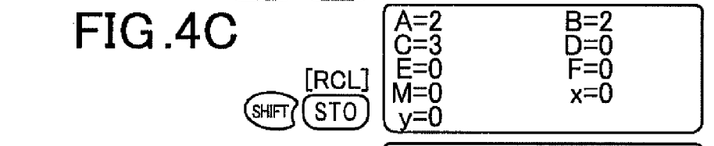
Figure 4D:
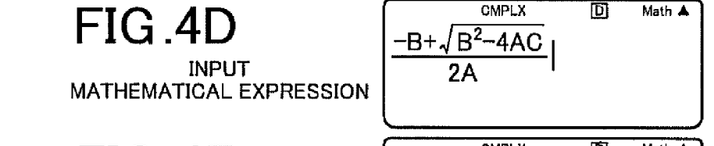
Figure 4E:
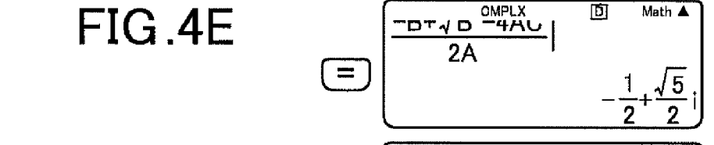
Figure 4F:
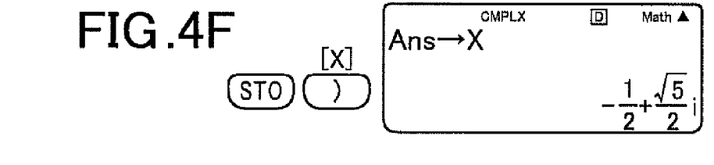
Figure 4G:
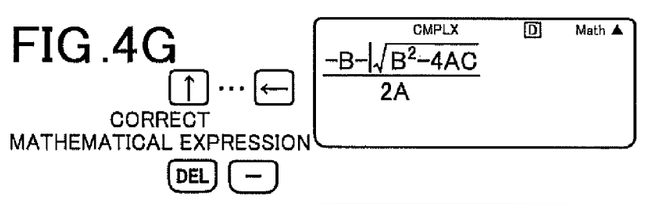

At that time, as illustrated in FIG. 4G for example, when a user moves the position of the cursor on the display 10, the CPU 11 of the scientific calculator 1 additionally displays the input data at the position of the cursor in the currently-input mathematical expression displayed on the display 10 (Step S15). Thus, the input mathematical expression can be arbitrarily corrected.

[Execution Processing]

When the execution key 28, namely the "=" key, is pressed and execution operation is performed (Step S17: YES), the CPU 11 of the scientific calculator 1 performs the process to execute calculation of the input mathematical expression. At that time, if the calculation formula includes a plurality of variables, the CPU 11 refers to the variable values of the respective variables stored in the variable value storing member to obtain the calculation result (Step S18). Then, the CPU 11 performs the process to display the calculation result on the display 10.

Figure 4H:
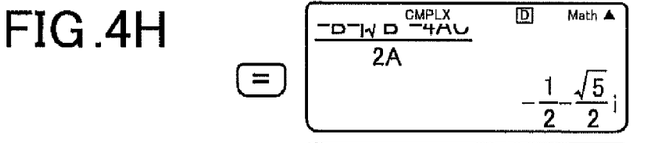

Thus, the CPU 11 functions as a calculation result displaying member which calculates the mathematical expression including the variable(s), input by user operations, and displays the calculation result. In this embodiment, when the execution key 28 (the "=" key) is pressed to perform the execution operation, the CPU 11 causes the display section 13 to display the calculation results in lower right regions on display 10, for example, as illustrated in FIG. 4E and FIG. 4H.

[Store Processing]

When a store operation is performed (Step S8: YES), the CPU 11 of the scientific calculator 1 judges whether or not any one of VARIABLE keys 26 is pressed (Step S9). When none of VARIABLE keys 26 is pressed (Step S9: NO) and any one of other keys is pressed, the process corresponding to the pressed key is performed.

When the store operation is performed and any one of VARIABLE keys 26 is pressed (Step S9: YES), if the mathematical expression is not currently being input (Step S10: NO), the CPU 11 sets the numerical value of the calculation result as the variable value of specified variable X, and displays "Ans→X" and the numerical value of the result on the display 10 (Step S12).

Specifically, as illustrated in FIG. 4A for example, when the STO key 27 is pressed after the "2" key of the numeric keypad 20 is pressed, and then the key of "A" among the VARIABLE keys 26 is pressed, the CPU 11 sets the input numerical value "2" as the variable value of the specified variable "A", in the variable value storing member. Incidentally, as illustrated in FIG. 4A, the set variable value is displayed in the lower right region of the display 10, in this embodiment. Similarly, when the STO key 27 is pressed after the "2" key of the numeric keypad 20 is pressed, and then the key corresponding to "B" among the VARIABLE keys 26 is pressed, the CPU 11 sets the input numerical value "2" as the variable value of the specified variable "B", in the variable value storing member.

Similarly, as illustrated in FIG. 4B, when the STO key 27 is pressed after the "3" key of the numeric keypad 20 is pressed, and then the key corresponding to "C" among the VARIABLE keys 26 is pressed, the CPU 11 sets the input numerical value "3" as the variable value of the specified variable "C", in the variable value storing member. By performing setting as described above, for example, variable values 2, 2 and 3 are set to variables A, B and C, respectively, as illustrated in FIG. 4C. Incidentally, the batch display illustrated in FIG. 4C, etc. will be described later.

When the Store operation is performed and any one of the VARIABLE keys 26 is pressed (Step S9: YES), if the mathematical expression is not currently being input and has been already input (Step S10: NO), the process is performed to set the numerical value of the calculation result as the variable value of the specified variable (Step S12).

Specifically, for example, when a certain mathematical expression is input as illustrated in FIG. 4D and the execution key 28 (the "=" key) is pressed to perform the execution operation (Step S17: YES), the CPU 11 retrieves the variable values of the respective variables in the mathematical expression from the variable value storing member, executes calculation of the mathematical expression (Step S18), and displays the calculation result on the display 10 (Step S19).

When the STO key 27 is pressed (Step S8: YES) and then the key of "X" among the VARIABLE keys 26 is pressed (Step S9: YES), because the execution operation has been already performed and the mathematical expression is not being currently input (Step S10: NO), the CPU 11 sets the numerical value of the calculation result as the variable value of specified variable X, and causes the display section 13 to display "Ans→X" in an upper left region of the display 10, and to display the set variable value in the lower right region of the display 10, as illustrated in FIG. 4F (Step S12).

Figure 4I:
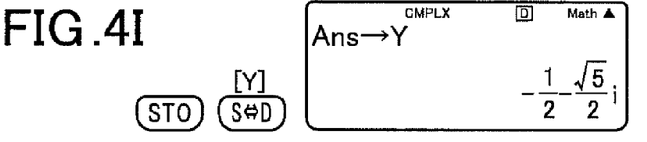

As illustrated in FIGS. 4G to 4I, also in the case that the mathematical expression is corrected (see FIG. 4G) and the execution operation is performed (see FIG. 4H), when the STO key 27 is subsequently pressed and then the key of "Y" among the VARIABLE keys 26 is pressed, the CPU 11 sets the numerical value of the calculation result of the corrected mathematical expression as the variable value of the specified variable Y (Step S12). The CPU 11 also causes the display section 13 to display "Ans→Y" in the upper left region of the display 10, and to display the set variable value in the lower right region of the display 10, as illustrated in FIG. 4I.

Figure 4J:
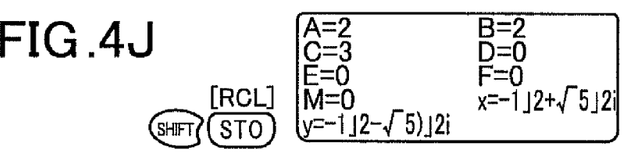

According to such setting process, as illustrated in FIG. 4J, the calculation results of the mathematical expression of FIG. 4D and the corrected mathematical expression of FIG. 4G are set as the variable values to variables X and Y, respectively. In this case, variable values 2, 2 and 3 are previously set to variables A, B and C, respectively. Sing "|" used in FIG. 4J and later-described FIG. 5E indicates division, and has the same meaning as sign "/".

Thus, the CPU 11 of this embodiment functions as a variable value setting member which specifies any one of the plurality of variables depending on the user operation, and sets the variable value of the specified variable in the storage area (the variable memory 163; see FIG. 2) of the storage section 16 as the variable value storing member, which stores the variables.

Meanwhile, when the Store operation is executed (Step S8: YES) and then any one of the variable keys 26 is pressed (Step S9: YES), if the mathematical expression is being currently input (Step S10: YES), the CPU 11 executes calculation of the input mathematical expression, causes the display section 13 to display "Mathematical expression on Input→Variable" and the calculation result on the display 10, and causes the storage section 16 to store the variable value of the variable (Step S11).

Specifically, though illustration is omitted, for example, when the STO key 27 is pressed to perform the Store operation (Step S8: YES) and then the key of "X" among the variable keys 26 is pressed (Step S9: YES) without the execution operation at the time of inputting mathematical expression "A+B+C" in the state that variable values 2, 2 and 3 of variables A, B and C are set as illustrated in FIGS. 4A and 4B, because the mathematical expression is currently being input in this case (Step S10: YES), the CPU 11 retrieves variable values 2, 2 and 3 of variables A, B and C from the variable value storing member (i.e. the variable memory 163) to execute calculation of the mathematical expression, causes the display section 13 to display "A+B+C→X" and to display the calculation result "7" in the lower right region or other regions of the display 10, and then causes the storage section 16 to store the result numerical value "7" as the variable value of variable X (Step S11).

[Variable Recall Batch Display Processing]

Next, the variable recall batch display processing characteristic of the present invention will be described.

When the SHIFT key 23 is pressed and then the STO key 27 is pressed to perform the Recall operation (Step S1: YES) as illustrated in FIG. 4C while the mathematical expression is being input and/or the variable value of the variable is being set by a user operation, the CPU 11 of the scientific calculator 1 performs the variable recall batch display processing.

Concretely, when the Recall operation is performed, the CPU 11 retrieves the previously-set variable values of variables A to F, M, X and Y from the variable memory 163 (see FIG. 2) of the storage section 16 as the variable value storing member, and causes the display section 13 to display the variables (A to F, M, X and Y) and the variable values of the variables in a list form on the display 10, as illustrated in FIG. 4C.

Thus, the CPU 11 of this embodiment functions as a variable value list displaying member which displays the list of the variable values of the variables stored in the variable value storing member (i.e. the variable memory 163 of the storage section 16), depending on the user operation, while the mathematical expression is being input. Incidentally, FIG. 4C illustrates the example of displaying the list of the variable values of the variables after the operations illustrated in FIGS. 4A and 4B are performed. Because variable values 2, 2 and 3 have been already set to variables A to C but no variable value is set to variables D to F, M, X and Y, values "O" are tentatively set to these variables.

Thus, according to the configuration where the variable values of the variables can be displayed in a list form while the mathematical expression is being input and/or the variable value of the variable is being set, a user can confirm the numerical values input with respect to the respective variables at one time by seeing the displayed list of the variable values of the variables, without repeatedly confirming each of the variable values of the variables or scrolling/switching the screens during inputting of the mathematical expression and/or setting of the variable value of the variable.

As described above, according to the mathematical expression input device (the scientific calculator 1) of this embodiment, a user can easily and accurately confirm the variable values set to all the variables, respectively, at one time.

On the other hand, when a user perform another operation without pressing any one of the VARIABLE keys 26 (Step S3: NO) while the list of the variable values of the variables is being displayed on the display 10, the CPU 11 of this embodiment returns the current display state of the display 10 to the original display state preceding the above-described Recall operation (Step S4), because it is conceivable that the user could confirm the intended variable value of the variable by seeing the displayed list of the variable values of the respective variable.

Meanwhile, when a user subsequently presses any one of the VARIABLE keys 26 to specify a certain variable while the list of the variable values of the variables is displayed on the display 10 (Step S3: YES), if the mathematical expression is being currently input at the timing immediately before displaying the list of the variable values of the variables on the display 10 (Step S5: YES), it is conceivable that the user, who has confirmed the intended variable value of the variable, specifies the certain variable to continue to input the mathematical expression.

For this reason, in this case (Step S5: YES), the CPU 11 of this embodiment performs processing to additionally input the variable, which is specified by the pressing operation of any one of the VARIABLE keys 26, in the mathematical expression which is being currently input (Step S6), so as to continue the inputting process of the mathematical expression. Thus, the CPU 11 of this embodiment functions as a listed variable inputting member which additionally input the variable in the currently-input mathematical expression when the variable value list displaying member (the CPU 11 itself) specifies any one of the displayed variables.

Moreover, when a user subsequently presses any one of the VARIABLE keys 26 to specify a certain variable while the list of the variable values of the variables is displayed on the display 10 (Step S3: YES), if the mathematical expression has been already input, namely, the execution operation of the mathematical expression has been performed, at the timing immediately before the list of the variable values of the variables is displayed on the display 10 (Step S5: NO), it is conceivable that a user sees the displayed list of the variable values of the variables in order to confirm which of the variables should be set because he/she wants to set the calculation result as the variable value of the certain variable.

For this reason, in this case (Step S5: NO), the CPU 11 of this embodiment performs the processing to set the numerical value of the calculation result as the variable value of the specified variable in the storage area (variable memory 163; see FIG. 2), which stores the variables, of the storage section 16 as the variable value storing member, and to display the variable value (Step S7).

According to such configuration, the inputting operation of the mathematical expression can be continued, and/or the calculation result can be set as the intended variable value of the variable, along with an intention of a user. Thus, the scientific calculator 1 as the mathematical expression input device of this embodiment is convenient for a user.

[Effects]

As described above, according to the scientific calculator 1 (the mathematical expression input device) and/or the programs of this embodiment, the CPU 11 is configured; to specify any one of plural variables A to F, M, X and Y according to the user operation, and to set the variable value of the specified variable in the storage section 16 (the variable value storing member) (i.e. a function as the variable value setting member); to calculate the mathematical expression including the variable(s) input by the user operation, and to display the calculation result on the display 10 (i.e. a function as the calculation result displaying member); to display the list of the variable values of the variables stored in the variable value storing member according to the user operation while the mathematical expression is being displayed (i.e. a function as the variable value list displaying member); and to additionally input the variable value in the currently-input mathematical expression when any one of the displayed variables is specified (i.e. a function as the listed variable inputting member).

Thus, a user can confirm what numerical value has been input with respect to each of the variables at one time, by seeing the displayed list of the variable values of the variables, while inputting the mathematical expression and/or setting the variable value of the variable, without repeatedly confirming the variable values of the variables one by one or scrolling/switching the screens, and can easily and accurately confirm the variable values set to all the variables, respectively, at one time.

[Digit Separator Existence Setting Process]

Next, a digit separator existence setting process will be described.

For example, when displaying the list of the variable values of the variables on the display 10 (Step S2), or when displaying the calculation result (Step S19), as described above, if the displayed numerical value of the variable value or calculation result has the large number of digits, sometimes a user cannot easily know the number of digits of the numerical value, and the numerical value is hard to be read.

For this reason, the scientific calculator 1 of this embodiment is configured so that a user can set whether the numerical value such as the calculation result or variable value is displayed with a digit separator(s), or without the digit separator, in such a case (Step S20).

Figure 5A:
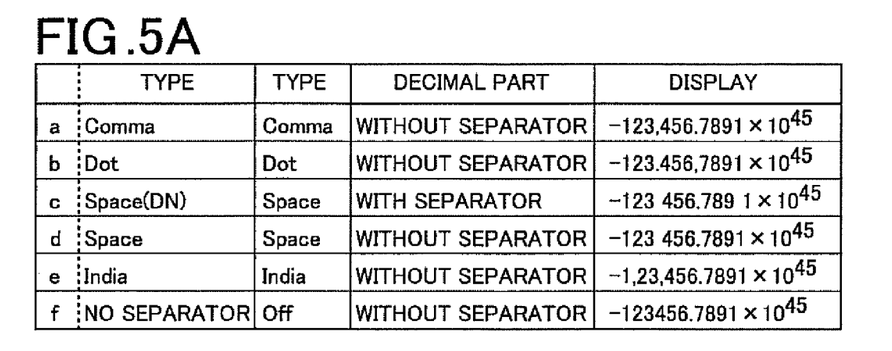
FIG. 5A is a diagram illustrating digit separator type information 162 in FIG. 2.

Specifically, in this embodiment, the storage section 16 (see FIG. 2) of the scientific calculator 1 previously stores the country information 161 and the digit separator type information 162, as described above. Regarding separation of digits of the numerical value, a digit separator type (the way of separating the digits) is different depending on the country. For this reason, as illustrated in FIG. 5A for example, as the digit separator type information 162, the way of separating the digits with Comma (in this case, a decimal point is represented by Dot); the way of separating the digits with Dot (in this case, a decimal point is represented by Comma, contrary to the above); and the way of separating the digits with Space (this case includes the case of separating also digits after the decimal point with Space (see "Space (DN)"), and the case of not separating the digits after the decimal point (see "Space")) are previously set.

In India, the digits of the numerical value is separated by inserting commas between hundreds place and thousands place, between ten-thousands place and hundred-thousands place, and between millions place and ten-millions place, for example, like "3,25,84,729". In this embodiment, also Indian digit separator type is previously stored as the digit separator type information 162, as illustrated in FIG. 5A. Moreover, in order to enable to select displaying the numerical value without the digit separator, the option of "Without Separator" is previously set as the digit separator type information 162.

Figure 5B:
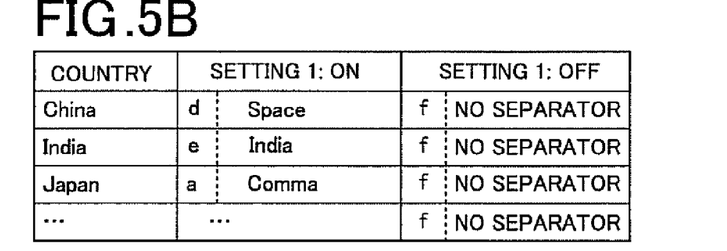
FIG. 5B is a diagram illustrating country information 161 in FIG. 2.

Because the digit separator type in the case of separating the digits of the numerical value is different depending on the country as described above, as illustrated in FIG. 5B, the storage section 16 of this embodiment previously stores, as the country information 161, information correlating each country name to the digit separator information of the country in the case of the display with the digit separator, in a table form, etc.

Figure 5C:
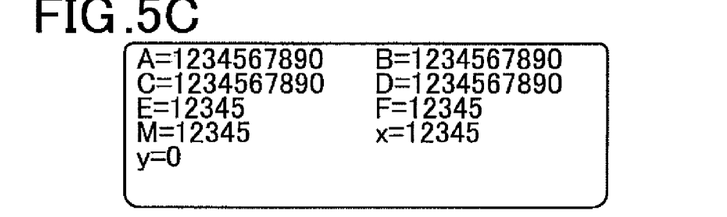
FIG. 5C is a diagram illustrating an example display of variable values of respective variables in the case that "without a digit separator" is set.
Figure 5D:
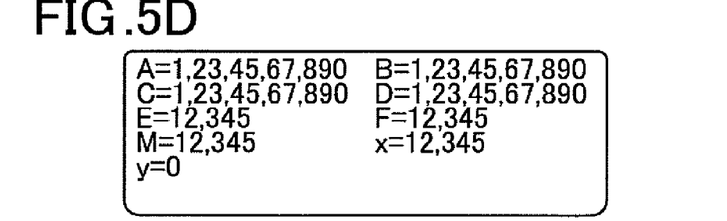
FIG. 5D is a diagram illustrating an example display of variable values of respective variables in the case that "with a digit separator" and "Indian type" are set.

For example, when displaying the list of the variable values of the variables on the display 10 as described above (Step S2), if setting is performed so that the variable values of the variables are displayed without the digit separator (see FIGS. 6C and 6D to be described later), the CPU 11 of the scientific calculator 1 causes the display section 13 to display the variable values of variables A to F, M, X and Y without the digit separator on the display 10, as illustrated in FIG. 5C. If the setting is performed so that the variable values of the variables are displayed with the digit separators, and for example, if Indian digit separator type is set at that time, the variable values of variables A to F, M, X and Y are displayed with the digit separators on the display 10 as illustrated in FIG. 5D.

Figure 5E:
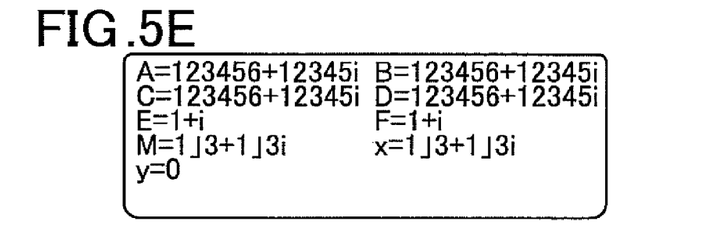
FIG. 5E is a diagram illustrating an example display of variable values of respective variables in the case that "with a digit separator" and "Japanese type" are set, and in the case that any one of the variable values of the variables includes an imaginary number or a fraction.

In this case, if any one of the variable values of the variables in the displayed list includes the numerical value(s) of complex number, fraction or square root, the mathematical expression becomes hard to be read if the numerical value of the variable value is displayed with the digit separators. For this reason, as illustrated in FIG. 5E for example, the CPU 11 of this embodiment displays at least the numerical value(s) of complex number, fraction or square root without the digit separator in the displayed list, in the case that any one of the variable values of the variables in the displayed list includes the numerical value(s) of complex number, fraction or square root, even when a user has performed setting to display the list of the variable values of the variables with the digit separators. For example, in the case of FIG. 5E, the variable value of "A" includes the complex number of "12345i", and "A=123456+12345i" is displayed without the digit separator, regardless the setting of "with a digit separator".

Hereinafter a specific example will be described with reference to FIGS. 6A to 6L. Incidentally, though the case where the Indian digit separator type is previously set will be described below, the same explanation can be applied also to the cases of performing digit separation with digit separators of other types illustrated in FIG. 5A.

As illustrated in FIG. 6A, for example, when a user presses "2", "5" and "0" of the numeric keypad 20 (see FIG. 1) to input "25000000", the CPU 11 of the scientific calculator 1 displays "25000000" on the display 10 (Step S16). When the STO key 27 is pressed to perform the Store operation (Step S8: YES) and key of "A" among the VARIABLE keys 26 is pressed (Step S9: YES), because the mathematical expression is not being currently input (Step S10: NO), the CPU 11 sets the input numerical value of "25000000" as the variable value of the specified variable in the variable memory 163 (see FIG. 2), and performs the display illustrated in FIG. 6A on the display 10 (Step S12).

When a user seeing the display wants to display the numerical value with the digit separator, a user can perform the setting operation related to the existence of the digit separator in this embodiment (Step S20). In the setting operation related to the existence of the digit separator, when a user presses the SHIFT key 23 and then presses the MODE SETUP key 22 (see FIG. 1) (Step S20: YES), the list of various modes is displayed as illustrated in FIG. 6B. When the user moves the cursor (not illustrated in FIG. 6B) downward to select "3: Separator", an ON/OFF list of the separator mode is displayed, as illustrated in FIG. 6C, in this case (Step S21). A user can select "1: On" to perform the operation to set "the display with the digit separator".

The CPU 11 then performs setting so that the variable values of the variables are displayed with the digit separator or without the digit separator, depending on the setting of the existence of the digit separator, the setting being selected and set by the user operation as described above (Step S22). Concretely, when the display with the digit separator (i.e. "On") is selected and set as described above, depending on the setting of the display with the digit separator, the variable value of variable "A", which has been displayed without the digit separator, like "25000000", is displayed with the digit separators, like "2,50,00,000" (see FIG. 6D), according to the digit separator type corresponding to country "India" among the digit separator type information 162 (see FIG. 5A) because "India" is previously set as the country information 161 (see FIG. 5B) stored in the storage section 16 (see FIG. 2) in this case.

In this state, when a user presses keys of "1", "2", "3", "4" and "0" of the numeric keypad 20 to input "1234000000" and performs the Store operation to set the input numerical value as the variable value of variable "C", the CPU 11 sets the input numerical value "1234000000" as the variable value of variable "C" in the variable memory 163 (see FIG. 2), and displays it with the digit separators on the display 10, like "1,23,40,00,000", as illustrated in FIG. 6E (Step S12).

Moreover, for example, if a user executes the variable Recall batch display processing (Steps S1 to S7 of FIG. 3) to display the list of the variable values of the variables at that time, the CPU 11 retrieves the variable values of the respective variables from the variable memory 163, and display the list of the variable values of the respective variables with the digit separators, as illustrated in FIG. 6F.

Meanwhile, as illustrated in FIG. 6K, a user can perform the operation to set "the display without the digit separator" by pressing the SHIFT key 23 and then pressing the MODE SETUP key 22 to select "3: Separator" from the displayed list by the SETUP function (see FIG. 6B), and selecting "2: Off" among the ON/OFF list displayed by the CPU 11 (Step S21; see FIG. 6C), in this embodiment (Step S22).

Thus, in this embodiment, a user can select and set "On" or "Off" to execute the setting of "with the digit separator" or "without the digit separator". When the setting of "without the digit separator" (i.e. "Off") is executed as described above, the CPU 11 changes "2,05,16,48,400" displayed with the digit separators, which is the calculation result of CY and the variable value of variable "D", into "2051648400" displayed without the digit separator, depending on the setting.

Furthermore, when a user presses the SHIFT key 23 and then presses the STO key 27 to execute the variable Recall batch display processing so that the list of the variable values of the variables is displayed at that time, the CPU 11 retrieves the variable values of the respective variables from the variable memory 163, and causes the display section 13 to display the list of the variable values of the variables without the digit separator, as illustrated in FIG. 6L.

Thus, when a user executes a setting operation to determine whether the variable values of the variables and/or the calculation results are displayed with the digit separator or without the digit separator, the CPU 11 of this embodiment functions as a digit separator existence setting member which sets whether the variable values and/or the calculation results are displayed with the digit separator or without the digit separator depending on the setting operation. Then, the CPU 11 as the above-described variable value list displaying member displays the list of the variable values of the variables depending on the setting of the existence of the digit separator set by the digit separator existence setting member (i.e. the CPU 11 itself) (see FIGS. 6F and 6L).

According to this configuration, it becomes possible to display the variable values of the variables and/or the calculation results with the digit separators or without the digit separator depending on whether a user wants to display them with the digit separators or without the digit separator. Thus, a user can more easily confirm the variable values of the variables and/or the calculation results. Moreover, because a user can freely set the existence of the digit separator, the scientific calculator 1 (the mathematical expression input device) can become more convenient for a user.

Incidentally, as illustrated in FIG. 6F, when a user executes the variable Recall batch display processing (Step S1: YES), and then presses, for example, the key corresponding to variable "A" among the VARUABLE keys 26 (concretely, presses a [(–)] (variable A) key or presses the SHIFT key 23 and then presses the [(–)] (variable A) key)

to specify the variable as illustrated in FIG. 6G (Step S3: YES) while the CPU 11 causes the display section 13 to display the list of the variable values of the variables on the display 10 (Step S2), because the mathematical expression is not being currently input (Step S: NO) in the state before the variable Recall batch display processing (see FIG. 6E), the CPU 11 retrieves the variable value of variable "A" from the variable memory 163 and causes the display section 13 to display the variable value ("25000000" in this case) of variable "A" with the digit separators, on the display 10, because "with the digit separator" is set.

By pressing the left cursor key 21, a user can continue the mathematical expression inputting process, the mathematical expression beginning from the valuable "A". Even when a user forgets whether an exchange rate of India Rupee is set as variable "X" or variable "Y", the user can confirm that the exchange rate of India Rupee is set to variable "Y" by executing the variable Recall batch display processing again so as to cause the display section 13 to display the list of the variable values of the variables on the display 10, as illustrated in FIG. 6H.

When a user subsequently presses the key corresponding to variable "Y" among the VARIABLE keys 26 (concretely, presses a [S⇌D] (variable Y) key or presses the SHIFT key and then presses the [S⇌D] (variable Y) key) to specify the variable as illustrated in FIG. 6I (Step S3: YES), because the mathematical expression is being currently input by inputting variable "A" and then pressing the left cursor key (Step S5: YES) at the timing before displaying the list of the variable values of the variables (see FIG. 6G), the CPU 11 performs the process to additionally input variable "Y" to currently-input mathematical expression "A" (Step S6) so as to continue the mathematical expression inputting process.

When a user executes the Store operation to set the calculation result of mathematical expression "AY" as the variable value of variable "B", the CPU 11 sets calculation result "41565000" of mathematical expression "AY" as the variable value of variable "B". In this case, as illustrated in FIG. 6I, the display is performed with the digit separators on the display 10. Similarly, when the operation is performed to set the calculation result of mathematical expression "CY" as the variable value of variable "D" as illustrated in FIG. 6J, the CPU 11 sets calculation result "205648400" as the variable value of variable D, and causes the display section 13 to display the calculation result with the digit separators on the display 10.

[Variation 1 of Digit Separator Existence Setting Processing]

In the above digit separator existence setting processing, the case where the country in the country information 161 is previously set to India is described. This is sufficient in the case that the scientific calculator 1 (the mathematical expression input device) is used only in India.

However, in the case that the scientific calculator 1 (the mathematical expression input device) is brought to various countries to be used therein, the configuration which enables a user to set the country is more convenient. In such a case, the configuration where the CPU 11 can properly set the digit separator type depending on the set country when the user selected the country is more preferably.

In this case, the CPU 11 is configured to function as a digit separator type setting member which sets, as the digit separator type, a mark or a position of the digit separator(s) for displaying the variable values of the variables and/or the calculation results with the digit separator(s), and to function as a country setting member which sets any one of countries depending on a user operation. The storage section 16 may be configured to function as a country dependent digit separator type storing member which stores the digit separator type (i.e. the digit separator type information 162 in this embodiment) by country. The CPU 11 as the variable value list displaying member may be configured to display the list of the variable values of the variables according to the digit separator type corresponding to the country set by the country setting member (i.e. the CPU 11 itself) when "with the digit separator" is being set as described above.

In this case, though illustration is omitted, for example, when a user presses the SHIFT key 23 and then presses the MODE SETUP key 22 to execute the SETUP function, and when the user selects the country in the executed SETUP function, the CPU 11 is configured to identify the digit separator type based on the country information 161 (see FIG. 5B) stored in the storage section 16, and to cause the display section 13 to display the list of the variable values of the variables and/or the calculation results, according to the digit separator type corresponding to the selected country, on the basis of the digit separator type information 162 (see FIG. 5A).

[Variation 2 of Digit Separator Existence Setting Processing]

It is also possible to adopt the configuration where a user directly sets the digit separator type, instead of selecting and setting the country name. Also in this case, the CPU 11 functions as the digit separator type setting member which sets, as the digit separator type, the mark or position of the digit separator(s) for displaying the variable values of the variables and/or the calculation results with the digit separator(s), by the user operation. Hereinafter, a specific example will be described with reference to FIGS. 7A to 7I.

Figure 7A:
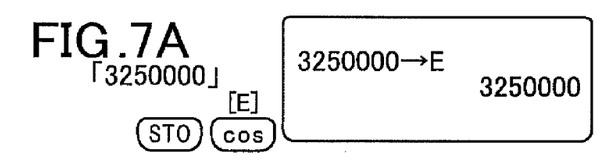
FIGS. 7A to 7I are diagrams illustrating operations and displayed contents on the display.

As illustrated in FIG. 7A, for example, when a user presses keys of "3", "2", "5" and "0" to input "3250000", then presses the STO key 27 to execute the Store operation, and presses the key of "E" among the VARIABLE keys 26, the CPU 11 sets the input numerical value "3250000" as the variable value of specified variable "E" in the variable memory 163 (see FIG. 2), and causes the display section 13 to display the numerical value on the display as illustrated in FIG. 7A.

Figure 7B:
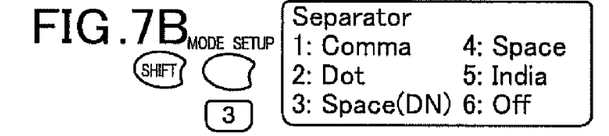
Figure 7C:
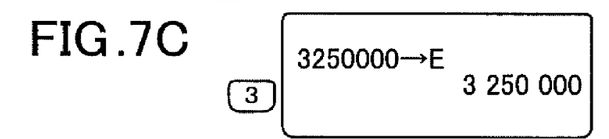

After that, when the user, who wants to display the numerical value with the digit separators, presses the SHIFT key 23 and the MODE SETUP key 22 so that the SETUP function is executed and the list of various modes is displayed (see FIG. 6B), and selects "3: Separator" among them, the CPU 11 causes the display section 13 to display the list of the digit separator types as illustrated in FIG. 7B, in this case. Then, for example, when the user selects "3: Space (DN)" among them, the CPU 11 refers to the digit separator type information 162 (see FIG. 5A) stored in the storage section 16 (see FIG. 2), and performs the display of variable value "3250000" of variable "E", with the digit separators, by the digit separating method corresponding to the digit separator type of "Space (DN)" in the digit separator type information 162, like "3 250 000" as illustrated in FIG. 7C.

Figure 7D:
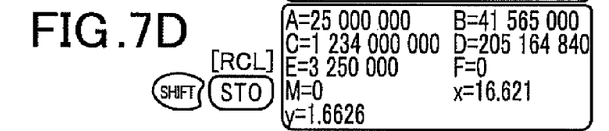
Figure 7E:
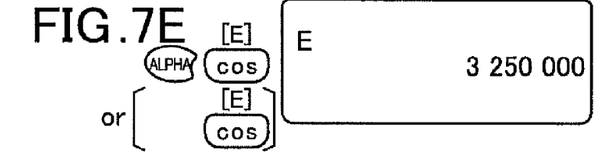

Moreover, for example, when the user presses the SHIFT key 23 and then presses the STO key 27 to perform the variable Recall batch display processing so that the list of the variable values of the variables is displayed as illustrated in FIG. 7D in this state, the CPU 11 retrieves the variable values of the variables from the variable memory 163, and performs the display of the variable values of the variables with the digit separators, correspondingly to the digit separator type of "Space (DN)". When a user presses the [cos] (variable E) key to specify the variable as illustrated in FIG. 7E (Step S3: YES) while the CPU 11 causes the display section 13 to display the list of the variable values of the variables on the display 10 (Step S2), the CPU 11 retrieves the variable value of variable "E" from the variable memory 163 and causes the display section 13 to display the variable value ("3250000" in this case) of variable "E" with the digit separators, on the display 10, because "with the digit separator" is set.

Figure 7F:
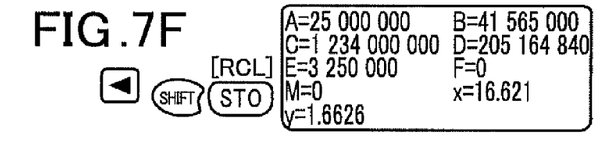

By pressing the left cursor key 21, a user can continue the mathematical expression inputting process, the mathematical expression beginning from the valuable "E". Even when a user forgets whether the exchange rate of Chinese yuan is set to variable "X" or variable "Y", the user can confirm that the exchange rate of Chinese yuan is set to variable "X" by performing the variable Recall batch display processing again to display the list of the variable values of the variables on the display 10, as illustrated in FIG. 7F.

Figure 7G:
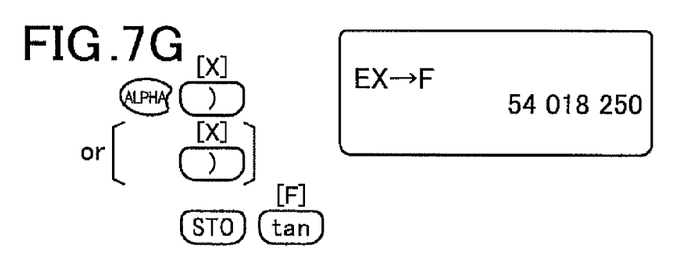

When a user subsequently presses the key of "X" among the VARIABLE key 26 (concretely, presses a [)] key (variable X) or presses the SHIFT key 23 and then presses the [)] key (variable X)) to specify the variable, the CPU 11 performs the process to additionally input variable "X" in currently-input mathematical expression "E", as illustrated in FIG. 7G. Then, when the user executes the Store operation to set the calculation result of mathematical expression "EX" as the variable value of variable "F", the CPU 11 sets calculation result "54018250" of mathematical expression "EX" as the variable value of variable "F", and causes the display section 13 to display the calculation result with the digit separators, correspondingly to the digit separator type of "Space (DN)".

In the case that the user wants to change the digit separator type to be displayed at this time, similarly to the cases of FIGS. 7B and 7C, when the user presses the SHIFT key 23 and then presses the MODE SETUP key 22, selects "3: Separator" from the displayed list of various modes by the SETUP function, and selects, for example, "1: Comma" from the displayed list of the digit separator types illustrated in FIG. 7B, the CPU 11 refers to the digit separator type information 162 (see FIG. 5A) stored in the storage section 16 (see FIG. 2).

Figure 7H:
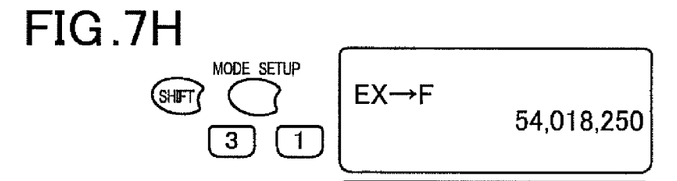
Figure 7I:
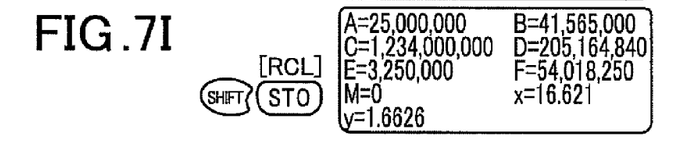

The CPU 11 then causes the display section 13 to display calculation result "54018250", by the digit separating method corresponding to the digit separator type of "Comma" among them, with the digit separators corresponding to the digit separator type of "Comma", like "54,018,250", as illustrated in FIG. 7H. In this case, when the variable Recall batch display processing is executed, the list of the variable values of the variables is displayed, with the digit separators corresponding to the digit separator type of "Comma", as illustrated in FIG. 7I.

According to the configuration of Variation 2, a user can display the variable values of the respective variables and/or the calculation results with the intended type of the digit separator, and the scientific calculator 1 (the mathematical expression input device) becomes convenient for a user.

Although some embodiments and variations of the present invention are described above, the scope of the present invention is not limited to the above embodiments and variations and includes the scope of the invention of the claims and the scope of equivalents thereof.

What is claimed is:

1. An electronic device comprising:
a memory; and
a processor, wherein
the processor causes a display section to display a plurality of variables and variable values of the variables stored in the memory in a list form,
causes the display section to display a first variable specified by a user operation, among the variables displayed in the list form, as a first part of an expression,
causes the display section to display the plurality of variables and the variable values of the variables after the display section displays the first variable as the first part of the expression,
causes the display section to display a second variable specified by a user operation, among the variables displayed in the list form, as a second part of the expression, together with the first part, and
calculates the expression based on the first part and the second part by referring to a variable value of the first variable and a variable value of the second variable among the variable values to obtain a calculation result.

2. The electronic device according to claim 1, wherein
when a user executes a setting operation to determine whether the calculation result and/or the variable values are displayed with a digit separator or without the digit separator, the processor performs setting about whether the calculation result and/or the variable values are displayed with a digit separator or without the digit separator, depending on the setting operation, in the memory,
causes the display section to display the variable values of the variables in the list form depending on the setting related to an existence of the digit separator, and
causes the display section to display the obtained calculation result depending on the setting related to the existence of the digit separator.

3. The electronic device according to claim 2, wherein
the processor sets, as a digit separator type, a mark or a position of the digit separator for displaying the calculation result and/or the variable values with the digit separator, in the memory,
stores the digit separator type by country in the memory,
sets any one of countries in the memory depending on a user operation, and
when the setting is performed so that the calculation result and/or the variable values are displayed with a digit separator, causes the display section to display the variable values of the variables in the list form according to the digit separator type corresponding to the set country.

4. The electronic device according to claim 2, wherein
the processor sets, as a digit separator type, a mark or a position of the digit separator for displaying the calculation result and/or the variable values with the digit separator, in the memory, and
sets the digit separator type depending on a user operation.

5. The electronic device according to claim 2, wherein
when any one of the variable values includes a numerical value of complex number, fraction or square root, the processor causes the display section to display the variable values of the variables in the list form so that the numerical value of complex number, fraction or square root is displayed without the digit separator regardless of the setting related to the existence of the digit separator in the memory.

6. The electronic device according to claim 1, further comprising:
the displaying section; and
a group of keys, wherein
the user operation is performed by using the group of keys.

7. A method for causing the computer to execute a process, the computer including a memory to store variable values of a plurality of variables and a display section, and the process including:
   causing the display section to display the plurality of variables and the variable values of the variables stored in the memory in a list form;
   causing the display section to display a first variable specified by a user operation, among the variables displayed in the list form, as a first part of an expression;
   causing the display section to display the plurality of variables and the variable values of the variables after the display section displays the first variable as the first part of the expression;
   causing the display section to display a second variable specified by a user operation, among the variables displayed in the list form, as a second part of the expression, together with the first part; and
   calculating the expression based on the first part and the second part by referring to a variable value of the first variable and a variable value of the second variable among the variable values to obtain a calculation result.

8. A non-transitory recording medium recording a program for controlling a computer of an electronic device including a memory to store variable values of a plurality of variables and a display section so that the computer functions so as to execute the steps of:
   causing the display section to display the plurality of variables and the variable values of the variables stored in the memory in a list form;
   causing the display section to display a first variable specified by a user operation, among the variables displayed in the list form, as a first part of an expression;
   causing the display section to display the plurality of variables and the variable values of the variables after the display section displays the first variable as the first part of the expression;
   causing the display section to display a second variable specified by a user operation, among the variables displayed in the list form, as a second part of the expression, together with the first part; and
   calculating the expression based on the first part and the second part by referring to a variable value of the first variable and a variable value of the second variable among the variable values to obtain a calculation result.

* * * * *